United States Patent [19]

Blum

[11] Patent Number: 5,360,512

[45] Date of Patent: Nov. 1, 1994

[54] METHOD AND PRODUCT FOR TREATING WASTE PAPER MATERIAL

[75] Inventor: Stanley Blum, London, England

[73] Assignee: Woodfree Limited, Chelmsford, United Kingdom

[21] Appl. No.: 914,210

[22] Filed: Jul. 14, 1992

Related U.S. Application Data

[63] Continuation-in-part of Ser. No. 761,744, Sep. 18, 1991, abandoned.

[51] Int. Cl.$^5$ ............................................. D21C 5/02
[52] U.S. Cl. ........................................... 162/8; 162/4
[58] Field of Search ................ 162/199, DIG. 4, 190, 162/181.2, 189.0, 4, 6, 8, 90, 78, 87; 252/174.14, 135

[56] References Cited

U.S. PATENT DOCUMENTS

| | | | |
|---|---|---|---|
| 441,462 | 11/1890 | Barnes | 162/8 |
| 1,628,931 | 5/1927 | Todd . | |
| 1,925,372 | 9/1933 | Darling . | |
| 1,988,363 | 1/1935 | Synder | 162/8 |
| 2,525,594 | 10/1950 | Fenneil . | |
| 3,285,849 | 11/1966 | Watanabe | 162/190 |
| 4,599,190 | 7/1986 | Maloney . | |
| 4,780,179 | 10/1988 | Clement . | |
| 4,964,949 | 10/1990 | Hamaguchi et al. . | |

FOREIGN PATENT DOCUMENTS

| | | | |
|---|---|---|---|
| 237408 | 4/1959 | Australia | 162/8 |
| 969714 | 6/1975 | Canada | 162/8 |
| 0092124 | 10/1983 | European Pat. Off. . | |
| 0174825 | 3/1986 | European Pat. Off. . | |
| 962255 | 6/1950 | France . | |
| 2281456 | 3/1976 | France . | |
| 12843 | 3/1974 | Japan | 162/8 |
| 0670654 | 6/1979 | Japan | 162/DIG. 4 |
| 020692 | 2/1981 | Japan | 162/8 |
| 870408 | 4/1987 | Sweden . | |
| 364756 | 1/1932 | United Kingdom . | |
| 506472 | 5/1939 | United Kingdom | 162/8 |
| 507791 | 6/1939 | United Kingdom | 162/8 |
| 1325505 | 8/1973 | United Kingdom . | |

OTHER PUBLICATIONS

Freeman, Horace, "A New Method Of Pitch Control In Newsprint Manufacture", Pulp and Paper Magazine of Canada, Jul. 1947.

Swanson, John et al., "Surface Chemical Studies on Pitch-A New Approach to the Pitch Problem in Papermaking", TAPPI, vol. 39 No. 10 (Oct. 1956) pp. 684–690.

Deinking of Paper, Institute of Paper Chemistry, Appleton, Wis. (Apr. 1943), Wict Publ, pp. 5–11.

B. Z. Smolyanitskii and B. N. Moiseev–"The Collection and Processing of Waste Paper", Lesnava Promyshlennost Publishing House, Moscow 1971, p. 151.

Sven, Stolt–"Detergent Chemistry"–Kemia-Kemi No. 11, 1984 pp. 864–868.

(List continued on next page.)

*Primary Examiner*—W. Gary Jones
*Assistant Examiner*—Branda Adele Lamb
*Attorney, Agent, or Firm*—Bell Seltzer Park

[57] ABSTRACT

The invention relates to a method and product for treating waste paper material in which the material is pulped to form a slush-like fibrous stock, an ink dispersing agent is added to disperse ink particles from the stock, and the dispersed ink particles are removed from the stock. The ink dispersing agent comprises a mixture of phosphated and carbonated sodium salts, which achieves effective ink dispersal at ambient temperatures and under neutral pH conditions. The ink dispersing agent can also be effectively used as a one-shot product without the addition of any other chemicals to the stock. It also detackifies and disperses stickies from the stock and improves white water clarity.

6 Claims, 1 Drawing Sheet

OTHER PUBLICATIONS

T. W. Woodward–"Chemicals used in the deinking of secondary fiber"–TAPPI 1986 Papermaking Chemical Processing Conference.

W. T. Woodward–"Appropriate chemical additives are key to improved deinking operations"–Pulp & Paper 1986; 11, pp. 59–63.

Swedish Patent Application 8601385-1 to J. E. Maloney et al., published Sep. 19, 1988 and corresponding to U.S. Pat. No. 4599190 dated Jul. 8, 1986.

Swedish Patent Application 7801471-8 to Koji Hamaguchi et al., published about Oct. 11, 1988 and corresponding to U.S. Pat. No. 4964949 dated Oct. 23, 1990.

European Patent Application No. 85306400.4–Publication No. 0174825 to R. H. Windhager and published on Mar. 19, 1986.

W. Berndt, "The Chemicals of the Deinking Process", PTS-Deinking-Symposium 1981, Munich 1981.

S. Seppälä, "Today we know more about the deinking process", Know-How Wire, journal published by Jaakko Pöyry, May 1988, pp. 32–34.

METHOD AND PRODUCT FOR TREATING WASTE PAPER MATERIAL

This application is a continuation-in-part of copending U.S. application Ser. No. 07/761,744 filed Sep. 18, 1991, now abandoned also in the name of Stanley Blum and assigned to BDL Specialist Products Limited.

FIELD OF THE INVENTION

This invention relates to a method and product for treating waste paper material and more particularly, though not exclusively, to a method and product for de-inking waste paper material, in which ink particles are dispersed from the pulped fibrous stock and subsequently removed by any suitable method, for example, by conventional washing or flotation techniques.

BACKGROUND OF THE INVENTION

In the paper and board industry, the use of secondary fibres derived from recycling waste paper material is well-known, and the dispersal and separation of ink particles from waste paper material and its secondary fibres is a necessary step in the recycling of the material, particularly in the production of paper for newsprint, tissues, and fine paper.

In known re-cycling processes, the waste paper or "furnish" is usually placed in a hydropulper where it is mixed with water and the following chemicals:

(1) caustic soda or other de-inking chemical,
(2) sodiummetasilicate a buffering agent, and
(3) hydrogen peroxide or other bleaching agent.

In the hydropulper, the "furnish" is disintegrated into a fibrous pulp, which is then de-inked and bleached by the added chemicals. From the hydropulper the fibrous pulp or slushed fibres, with a consistency of 15% (as in high consistency pulping) or 5–6% (as in mills not using high consistency pulping), is dumped into a series of "dump" or storage chests where the slushed fibres are diluted down to a consistency of around 1.5%.

The "stock" or diluted slush fibres then pass to the de-inking equipment, which either consists of flotation cells or washing screens or a combination of these, where the dispersed ink particles are removed from the slushed fibres.

In the method of utilising flotation cells, a "collector" soap is added to the "stock" prior to entering the de-inking cell to agglomerate the dispersed ink-particles which then float to the surface of the cell on air-bubbles which are sourced at the base of the flotation cell and which are then skimmed off.

In the washing method of de-inking, the dispersed ink particles are washed out of the system by passing the stock onto a rotary decker, a sidemill screen, a screw press, or similar equipment, using large volumes of water.

These known methods of de-inking require the addition of a number of different chemicals to achieve the de-inking process which is generally carried out at high temperatures, for example at least 122° F. (50° C.), and under strong alkaline conditions. Some chemicals are also only effective for one of the two different methods, i.e. flotation and washing methods, and cannot be used in the other method. Furthermore, caustic soda, which is most commonly used in relatively large amounts as a de-inking chemical, can attack the fibres and may not be regarded as being environunentally safe when emptied from the mill into external water sources.

SUMMARY OF THE INVENTION

The present invention aims to provide a much simplified, cost-effective and improved method of treating the waste paper material, and a product therefor, and in particular for de-inking the waste paper material, which substantially reduces the number of chemicals required to be added to the fibrous stock and removes the necessity for using caustic soda.

A further aim of the invention is to provide an improved method and product for treating waste paper material which detackifies and disperses stickies from the pulped waste paper stock.

According to the invention, a method of treating waste paper material comprises the steps of pulping the waste paper material to form a fibrous stock of a slush-like consistency, adding to the stock a product to disperse ink particles and/or to detackify and disperse stickies from the fibrous stock. The ink particles and/or stickies are then removed from the stock by any suitable technique, such as conventional washing and flotation techniques. The product comprises a mixture of phosphated and carbonated sodiu/n salts, which has been found to work extremely effectively under one or more novel operating conditions including ambient temperatures without any heat applied to the stock, neutral pH values, and as a one-shot product without the addition of any other chemicals to the stock, whilst still producing high quality recycled paper and without increasing normal pulping and de-inking cycle times.

Use of the product can also provide further unexpected benefits, such as improving white water clarity, improving machine runability and increasing machine speed.

In one embodiment, the product comprises 1 to 75% weight in weight of sodium carbonate and 25 to 99% weight in weight of sodium phosphate, with a preferred specific mixture comprising 8% sodium carbonate and 92% trisodium phosphate. The product may also include 1 to 2% weight in weight of metasilicates and/or 0.5 to 2% weight in weight of caustic soda, and/or hygroscopic salts, together with a non-caustic booster, and possibly a sanitiser. If desired, a bleaching chemical may be added, for example 0.25 to 5% weight in weight of hydrogen peroxide or any other suitable bleaching agent.

DETAILED DESCRIPTION OF THE INVENTION

Figure 1:
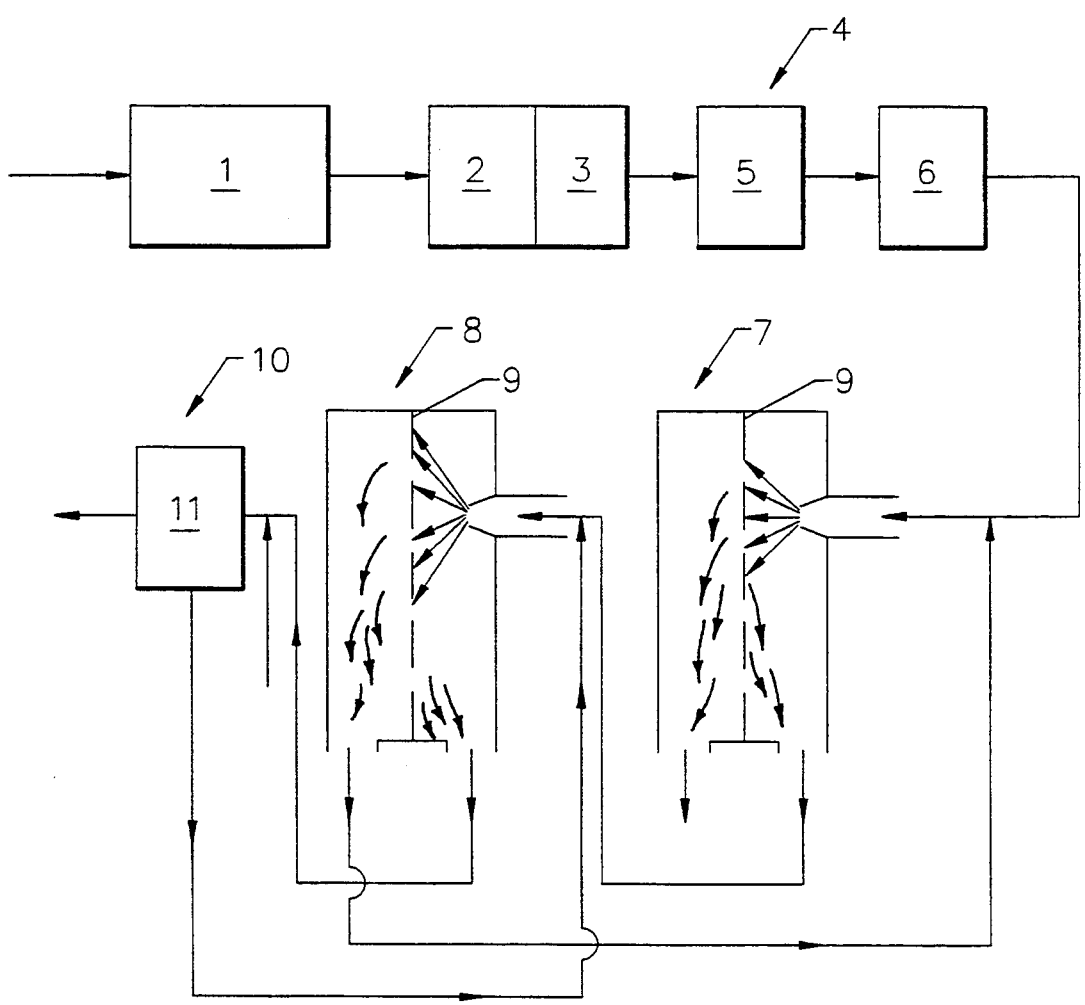

The invention will now be further described by way of example with reference to the accompanying drawing, which illustrates schematically one embodiment of the present invention.

Referring now to the drawing, there is shown a flow diagram of a washing method of de-inking, the steps of which are well-known to those skilled in the art, except for the replacement of known de-inking chemicals by the ink dispersing agent as used in accordance with the present invention.

In the illustrated method, waste paper is fed into a hydropulper 1, in which it is disintegrated into a fibrous pulp or fibrous stock of a slushed consistency. Water is added to the stock, together with an ink dispersant to disperse ink particles from the stock. From there, the stock and dispersed ink particles pass into a centrifugal cleaner 2 to remove grit, pins, clips, etc, and through a screen 3 to remove oversized particles. The stock then passes to a first washing stage 4 consisting of a thickener 5 and a fine deflaker or disperser 6, which produces a well defibered stock, which is reasonably clean and free from ink specks but still contains very small ink particles. From there, the stock passes to second and third washing stages, 7 and 8 respectively, each including a vertical screen 9 and in which dilution water is added to the stock. A fourth washing stage 10 consists of another thickener 11, and the clean stock is then passed from the thickener 11 to refiners and paper-making machinery.

In accordance with an embodiment of the present invention, the ink dispersant added to disperse the ink particles consists of a mixture of 1 to 75% weight in weight of sodium carbonate and 25 to 99% weight in weight of sodium phosphate, with a preferred composition being 8% weight in weight of sodium carbonate and 92% weight in weight of trisodium phosphate. Alternatively, the ink dispersant may include, in addition to these two components, small quantities of metasilicates (for example 1 to 2% weight in weight) and/or caustic soda (for example 0.5 to 2% weight in weight). The composition may be further enhanced by using hygroscopic salts, together with a noncaustic booster, and may include a sanitiser. A bleaching agent, for example 0.25 to 5% hydrogen peroxide, may also be added.

As an alternative to the above-described washing method of de-inking, the substance may be utilised to disperse ink particles in known flotation methods.

The use of this ink dispersing agent in de-inking methods has many surprising and unexpected advantages over the use of conventional de-inking chemicals. These advantages include:

(1) It is an effective ink dispersing agent in both traditional methods of de-inking (i.e. Flotation and Washing), unlike other de-inking products which are only effective in one or other of the traditional methods but not both.

(2) It is most effective as an ink dispersing agent under neutral pH conditions, that is, in the pH range of approximately 6.8 to 7–8. In laboratory evaluations, it has been found that the best results with respect to brightness of the final recycled paper product using the ink dispersing agent of the present invention with either the washing or flotation method are achieved at a neutral pH of 7. These evaluations were carried out on woody mechanical waste (70% newsprint: 30% periodicals and magazines (Pams)), at a hydropulper consistency of 5% and a dosage level of 0.3% of the ink dispersant added as a one-shot product. The same results were also obtained on woodfree waste, in which the furnish was 100% laser printed office waste.

(3) By virtue of its formulation, it can be used as a "one-shot" ink dispersing agent in the hydropulper, without the need for the addition of buffering agent or any other chemical in the hydropulper.

(4) It is effective as an ink dispersant at ambient temperatures at least as low as 48° F. (9° C.) and therefore saves the power required to heat the hydropulper contents of 122°–140° F. (50°–60° C.), as is necessary in known methods using other de-inking chemicals.

(5) Unlike caustic soda, it does not attack the fibres, and therefore gives a stronger paper end product, and may be used as a caustic soda replacement in the hydropulper.

(6) As an ink dispersant, it does not require a collector soap in Flotation de-inking, nor the high temperature (140° C.) necessary when a collector soap is used, this giving further economies in use.

(7) It is safer to the environment, i.e. it is much less toxic to aquatic wildlife, and has lower and more acceptable Biological Oxygen Demand (B.O.D.) and Chemical Oxygen Demand (C.O.D.) when emptied from the mill into external water sources than other conventional de-inking products used at the present time e.g. caustic soda or bleach.

(8) It can be used effectively to remove stickles or gums in addition, or as an alternative, to its ink dispersing qualities. It can detackify and disperse up to at least 85% of the stickles to enable them to be passed out, thus removing the bulk of a major problem of the paper recycling industry, which can account for expensive "downtime" of the machinery. In experiments carried out on acrylic copolymer stickles, it has been found that the present novel method using the ink dispersant detackifies the stickles and either agglomerates at least 50% of the detackified stickles if the ink dispersant is added at the beginning of the pulping cycle, or disperses at least 85% of the detackified stickles if added towards the end of the pulping cycle. Practical mill trials, using the present ink dispersant, at tissue, fine writings, and board mills have corroborated these experimental results, as well as finding additional benefits in better machine runability, less breaks in new sheet formulation, and cleaner wires and felts resulting in improved end products and reduced machine down-time.

(9) Use of the ink dispersing agent substantially improves white water clarity. In a mill trial carried out on three different grades of waste, the present ink dispersant was used as a one-shot product at a dosage of 0.2% on waste in neutral pH conditions. The three different grades of waste used were:
(i) Mechanical - 80% News: 15% Mixed News and Pams: 5% Own Mechanical Broke.
(ii) Unbleached Furnish - 25% Own Unbleached Broke: 25% Computer Print-Out (C.P.O.): 25% Colored Best Pams: 25% Mixed Mechanical.
(iii) Bleached Furnish - 25% Own Bleached Broke: 50% C.P.O.: 25% Colored Best Pams.

The results of this trial showed that the present method not only produces a paper end product on a single wire machine with good brightness which equalled the brightness of the end product achieved on a twin-wire machine with better washing and using conventional de-inking chemicals but, at the same time, it also improved the white water clarity from a low 4 (measured on a wedge) to a high 11.

(10) In mill trials, the ink dispersing agent has been found to have excellent "former" properties in that it gives a uniform distribution of fibres in the finished paper which results in a better quality end product.

(11) It is most effective as an ink dispersant at low dosages up to about 1% on waste. However, the preferred dosage levels are approximately 0–1% in flotation de-inking and 0.2% in washing de-inking.

Furthermore, mill machine runs and further experimental procedures utilising this substance in deinking methods have revealed the following additional advantages:

(a) striking increases in the strength of the recycled products of between 5 to 30% depending on the waste mix in the furnish used;

(b) production of a better, less speckled product when used to de-ink better grade, office-type waste paper, hitherto known as "difficult to de-ink" grade (i.e. wood-free waste); and (c) successful attacks on laser print, xerographic print, hitherto known as "difficult to remove" inks, and on the new FLEXO inks, as well as producing a higher brightness than standard de-inking products.

EXAMPLES

The following two examples illustrate use of an embodiment of the present novel method on two different grades of waste in a tissue mill using both the flotation and washing techniques.

EXAMPLE 1

In a helical-type hydropulper, at a pulp consistency of 15%, the present ink dispersing agent comprising a mixture of phosphate and carbonated sodium salts was added to the stock, in place of all conventional pulper chemicals (including caustic soda and sodium hypochlorite) as well as all collector chemicals used in the flotation cell. The dosage of ink dispersant added was 0.1% on waste at a hydropulper water temperature of 61° F. (16° C.), i.e. ambient temperature, and a pH of 7.4, and the hydropulper cycle time was 30 minutes. The waste paper used was 66.7% Pams:33.3% office waste.

The results produced a hydropulper brightness of 64/65 and a final brightness of 80/82, giving a lift of 16/17 points compared with usual final brightness levels of 73/74 achieved in conventional methods.

After six months regular usage of the novel method by the same mill, any problems concerning removal of stickles had disappeared giving better machine runability, improved "creping" giving a softer "feel" to the tissue produced was achieved, there was less "defoamer" usage in the flotation cell, and coating on the cylinder was more stable.

EXAMPLE 2

Using the same ink dispersing agent under the same operating conditions as in Example 1, but on waste paper consisting of 50% News:50% Pams, the machinery ran well, the stock de-inked well, and a final brightness of 68-70 ISO was achieved. This compares favorably against the usual brightness of 59 to 60 ISO, which is achieved with similar waste and using conventional de-inking chemicals.

EXAMPLE 3

In a third example at a printings and fine writings mill, the ink dispersing agent was used as a one-shot product replacing all the usual de-inking chemicals under neutral pH conditions on the following furnishes:

(i) 25% Magazine Trims: 25% White Letter: 50% Pulp bleached Kraft Birch CTMP, and (ii) 400 Kilos over-issue News: 400 Kilos Woody One Cuts: 800 Kilos L-P Scan (or U.P. Scan): 800 Kilos constat or White Letter.

The final end products had improved brightness and cleanness compared to sheets prepared using conventional chemicals. Additionally, increase in machine speed peaked at 25% with an average 15-20% increase.

Whilst particular embodiments of the present invention have been described, various modifications will be envisaged without departure from the scope of the invention as defined in the appended claims. For example, the product comprising a mixture of phosphated and carbonated sodium salts can be effectively used just to remove stickies and improve white water clarity on non-inked waste paper, as well as being used as an ink dispersant on inked waste paper. Moreover, although a mixture of sodium carbonate and trisodium phosphate has been used as a working example, alternative mixtures of phosphated and carbonated sodium salts will effectively act as an ink dispersant and/or remover of stickles under the operating conditions described herein.

What is claimed is:

1. A method of de-inking waste paper material comprising the steps of:

pulping the paper material to form a fibrous stock of a slush-like consistency;

adding an ink dispersing agent having a composition whereby ink particles are dispersed from the fibrous stock; and removing said dispersed ink particles from the stock; wherein the composition of said ink dispersing agent is selected from the group consisting of:

(i) a mixture of approximately 92% weight in weight of a sodium phosphate and approximately 8% weight in weight of sodium carbonate;

(ii) a mixture of phosphated and carbonated sodium salts which includes approximately 1 to 2% weight in weight of metasilicates; and (iii) a mixture of phosphated and carbonated sodium salts which includes approximately 0.5% to 2% weight in weight of caustic soda.

2. A method as claimed in claim 1, wherein said ink dispersing agent is added to the fibrous stock at ambient temperatures without applying heat thereto.

3. A method as claimed in claim 1, wherein the paper material is pulped in a hydropulper and the ink dispersing agent is added to the fibrous stock in the hydropulper as a one-shot product without adding any other chemical to the hydropulper.

4. A method as claimed in claim 3, wherein the stock is passed from the hydropulper to flotation cells in which a flotation technique is used to remove the dispersed ink particles from the fibrous stock, and the one-shot product also replaces collector soaps conventionally used in the flotation cells.

5. A method as claimed in claim 1, wherein the ink dispersing agent is added to the fibrous stock at a dosage of up to approximately 1% on stock.

6. A method as claimed in claim 1, wherein the ink dispersing agent is added to the fibrous stock at substantially neutral pH conditions of approximately 6.8 to 7.8.

* * * * *

UNITED STATES PATENT AND TRADEMARK OFFICE
CERTIFICATE OF CORRECTION

PATENT NO. : 5,360,512
DATED : November 1, 1994
INVENTOR(S) : Stanley Blum

It is certified that error appears in the above-indentified patent and that said Letters Patent is hereby corrected as shown below:

TITLE PAGE:

Under References Cited: U.S. Patent Documents - "Synder" should be -- Snyder --; "Maloney" should be -- Maloney et al. --.
Foreign Patent Documents - "0670654 Japan" should be -- 0670654 S.U. --.
Other Publications - "Lesnava" should be -- Lesnaya --; page 2, "W.T." should be -- T.W. --.

Column 1, line 7, after "abandoned" insert a comma (,); line 67, "envirorumentally" should be -- environmentally --.

Column 2, line 23, "sodiu/n should be -- sodium --.

Column 3, line 41, "7-8" should be -- 7.8 --.

Column 4, lines 12, 15, 22, 23 and 25, "stickles" should be -- stickies --.

Column 4, line 18, "downtime" should be -- down-time --.

Column 4, line 63, "0-1" should be -- 0.1 --.

Column 4, line 66, "deinking" should be -- de-inking --.

Column 5, line 41, "stickles" should be -- stickies --.

UNITED STATES PATENT AND TRADEMARK OFFICE
CERTIFICATE OF CORRECTION

PATENT NO. : 5,360,512
DATED : November 1, 1994
INVENTOR(S) : Stanley Blum

It is certified that error appears in the above-indentified patent and that said Letters Patent is hereby corrected as shown below:

```
  Column 6, line 21, "stickles" should be -- stickies
--.
```

Signed and Sealed this

Twenty-eight Day of February, 1995

Attest:

BRUCE LEHMAN

Attesting Officer        Commissioner of Patents and Trademarks